United States Patent
Wakumoto et al.

(10) Patent No.: US 7,447,223 B2
(45) Date of Patent: Nov. 4, 2008

(54) SWITCHING MESH WITH BROADCAST PATH REDUNDANCY

(75) Inventors: Shaun Kazuo Wakumoto, Roseville, CA (US); Ballard Claude Bare, Auburn, CA (US); Cetin Ersoy, Portsmouth, NH (US); Amit Green, Pelham, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 841 days.

(21) Appl. No.: 10/767,236

(22) Filed: Jan. 28, 2004

(65) Prior Publication Data

US 2005/0163137 A1      Jul. 28, 2005

(51) Int. Cl.
*H04L 12/28*      (2006.01)
(52) U.S. Cl. ..................................... 370/406
(58) Field of Classification Search ........................ None
See application file for complete search history.

(56) References Cited

U.S. PATENT DOCUMENTS

| | | | |
|---|---|---|---|
| 5,461,615 A * | 10/1995 | Henrion | 370/355 |
| 5,495,471 A * | 2/1996 | Chow et al. | 370/221 |
| 6,067,300 A * | 5/2000 | Baumert et al. | 370/413 |
| 6,247,058 B1 * | 6/2001 | Miller et al. | 709/234 |
| 6,577,600 B1 | 6/2003 | Bare | |
| 6,580,715 B1 | 6/2003 | Bare | |
| 2002/0116515 A1 * | 8/2002 | Hashimoto | 709/230 |
| 2002/0176359 A1 * | 11/2002 | Durinovic-Johri et al. | 370/229 |
| 2003/0108069 A1 * | 6/2003 | Yamada | 370/535 |
| 2005/0213582 A1 * | 9/2005 | Wakumoto et al. | 370/395.3 |

* cited by examiner

*Primary Examiner*—Edan Orgad
*Assistant Examiner*—Blanche Wong

(57) ABSTRACT

One embodiment disclosed relates to a method of broadcasting packets through a network of switches. A packet is received to be broadcast through the network of switches. A broadcast path is selected from a plurality of generated broadcast paths. A broadcast path tag associated with the selected broadcast path is created and inserted into the packet. A determination is made of the port(s) by which to forward the packet, and the packet is transmitted via the port(s) to next switch(es) in accordance with the selected broadcast path.

14 Claims, 15 Drawing Sheets

| Source Switch Identifier 602 | Destination Switch Identifier 604 | Path Identifier (0-15) 606 |
|---|---|---|
| 6 bits | 6 bits | 4 bits |

FIG. 6

L2 Mac Table 1402

| MAC addr | VID | tag | port |
|---|---|---|---|
| 000883-123456 | 1 | 23ab | 10 |
| 000883-654321 | 3 | 4532 | 16 |
| . | . | . | . |
| 080009-2468ac | 1 | 4532 | 20 |

Tag Table 1404

| tag | bcast? | port |
|---|---|---|
| 4532 | - | 10 |
| 2314 | - | 26 |
| . | . | . |
| 7524 | X | 2 |

Broadcast Port Map Filter 1406

| index | port map |
|---|---|
| 0 | 00000000000000000101100011 |
| 1 | 00000000000000010010001110 |
| 2 | 00000000000000001110101011 |
| . | . |
| n | 00000000000000001110001010 |

FIG. 14

SWITCHING MESH WITH BROADCAST PATH REDUNDANCY

BACKGROUND OF THE INVENTION

1. Field of the Invention

The present invention relates generally to communication networks. More specifically, the present invention relates to network switches and switch-to-switch protocols.

2. Description of the Background Art

It is common in conventional computing environments to connect a plurality of computing systems and devices through a communication medium often referred to as a network. Such networks among communicating devices permit devices (or users of devices) to easily exchange and share information among the various devices. The Internet is a presently popular example of such networking on a global scale. Individual users attach their computers to the Internet, thereby enabling sharing of vast quantities of data on other computers geographically dispersed throughout the world.

Networked computing systems may be configured and graphically depicted in a wide variety of common topologies. In other words, the particular configurations of network communication links (also referred to as paths) and devices between a particular pair of devices wishing to exchange information may be widely varied. Any particular connection between two computers attached to a network may be direct or may pass through a large number of intermediate devices in the network. In addition, there may be a plurality of alternative paths through the network connecting any two network devices. Computing networks are therefore complex and vary in their configurations and topologies.

Certain network communication media and protocols are referred to as packet oriented. A protocol or communication medium may be said to be packet oriented in that information to be exchanged over the network is broken into discrete sized packets of information. A block of information to be transferred over the network is decomposed into one or more packets for purposes of transmission over the network. At the receiving end of the network transmission, the packets are re-assembled into the original block of data.

In general, each packet includes embedded control and addressing information that identifies the source device which originated the transmission of the packet and which identifies the destination device to which the packet is transmitted. Identification of source and destination devices is by means of an address associated with each device. An address is an identifier which is unique within the particular computing network to identify each device associated with the network. Such addresses may be unique to only a particular network environment (i.e., a network used to interconnect a single, self-contained computing environment) or may be generated and assigned to devices so as to be globally unique in co-operation with networking standards organizations.

At the lowest level of network communication, such addresses are often referred to as MAC address (Media ACcess address). Network protocols operable above this lowest level of communication may use other addresses for other purposes in the higher-level communication techniques.

In many conventional commercially-available network environments, the network communication medium is in essence a bus commonly attached to a plurality of devices over which the devices exchange. In a simple networking topology, all devices may be attached to such a bus-structured common network medium. Any particular single network medium has a maximum data exchange bandwidth associated therewith. The maximum data exchange bandwidth of a medium is determined by a number of electrical and physical properties of the medium and protocols used to communicate over that medium. For example, a popular family of related network media and protocols are collectively referred to as Ethernet. Ethernet defines a standard protocol for the exchange of messages over the communication medium. A variety of communication media are also defined as part of the Ethernet family. The communication bandwidth of the Ethernet family of standards may change over time, but conventionally ranges from approximately 10 Mbit (million bits of information) per second to 1 Gbit per second. Therefore, a single (slow) Ethernet connection, for example, has a maximum data exchange bandwidth of approximately 10 Mbit per second.

In conventional network computing environments, a number of devices are used in addition to interconnected computing systems to efficiently transfer data over the network. Routers and switches are in general network devices which segregate information flows over various segments of a computer network. A segment, as used herein, is any subset of the network computing environment including devices and their respective interconnecting communication links. As noted above, a single computer network communication link has a maximum data transfer bandwidth parameter defining the maximum rate of information exchange over that network. Where all devices on a computer network share a common network medium, the maximum bandwidth of the computer network may be rapidly reached. The overall performance of the networked computing environment may be thereby reduced because information exchange requests may have to await completion of earlier information exchange requests presently utilizing the communication link.

It is often the case, however, that particular subsets of devices attached to the network have requirements for voluminous communication among members of the same subset but less of a requirement for information exchange with other devices outside their own subset. Though standard switch features generally do not include identifying such logical groupings of devices, some enhanced switching features do permit such logic to be performed within a switch device. For example, some enhanced switch features include the concept of defining and routing information based on virtual LAN (VLAN) definitions. In a VLAN, a group of devices may be defined as logically being isolated on a separate network although physically they are connected to a larger network of devices. VLAN features of enhanced switches are capable of recognizing such VLAN information and can route information appropriately so that devices in a particular VLAN are logically segregated from devices outside the VLAN.

For example, the financial department of a large corporation may have significant information exchange requirements within the financial department but comparatively insignificant needs for data exchange with other departments. Likewise, an engineering group may have significant needs for data exchange within members (computing systems and devices) of the same engineering group but not outside the engineering group. There may in fact be multiple of such subsets of devices in a typical computing network. It is therefore desirable to segregate such subsets of devices from one another so as to reduce the volume of information exchange applied to the various segments of the computer network.

In particular, a switch device is a device that filters out packets on the network destined for devices outside a defined subset (segment) and forwards information directed between computing devices on different segments of a networked computing environment. The filtering and forwarding of such information is based on configuration information within the switch that describes the data packets to be filtered and forwarded in terms of source and/or destination address information (once address locations are. "learned" by the switch (es)).

Network switch devices and protocols associated therewith are also used to manage redundant paths between network devices. Where there is but a single path connecting two network devices, that single path, including all intermediate devices between the source and destination devices, represent a single point of failure in network communications between that source and destination device. It is therefore common in network computing environments to utilize a plurality of redundant paths to enhance reliability of the network. Multiple paths between two devices enhances reliability of network communication between the devices by allowing for a redundant (backup) network path to be used between two devices when a primary path fails.

SUMMARY

One embodiment of the invention pertains to a method of broadcasting packets through a network of switches. A packet is received to be broadcast through the network of switches. A broadcast path is selected from a plurality of generated broadcast paths. A broadcast path tag associated with the selected broadcast path is created and inserted into the packet. A determination is made of the port(s) by which to forward the packet, and the packet is transmitted via the port(s) to next switch(es) in accordance with the selected broadcast path.

Another embodiment of the invention relates to a switching device configured to be a member of a switching mesh. The switching device includes a plurality of ports, and a switch control device coupled to the plurality of ports. The switch control device is configured to provide multiple broadcast paths from an source switch through the switching mesh.

Another embodiment of the invention relates to a method of configuring broadcasts in a switching mesh. Multiple broadcast paths are generated by an algorithm in a source switch. A broadcast path generation packet for each generated broadcast path is broadcast out from the source switch to remaining switches in the switching mesh.

BRIEF DESCRIPTION OF THE DRAWINGS

FIG. 6 is a diagram of a path tag in accordance with an embodiment of the invention.

FIG. 14 is a diagram depicting various tables used in implementing the multiple broadcast path functionality in accordance with one embodiment of the invention.

DETAILED DESCRIPTION

I. Broadcasting in Conventional Switching Network

Figure 1:
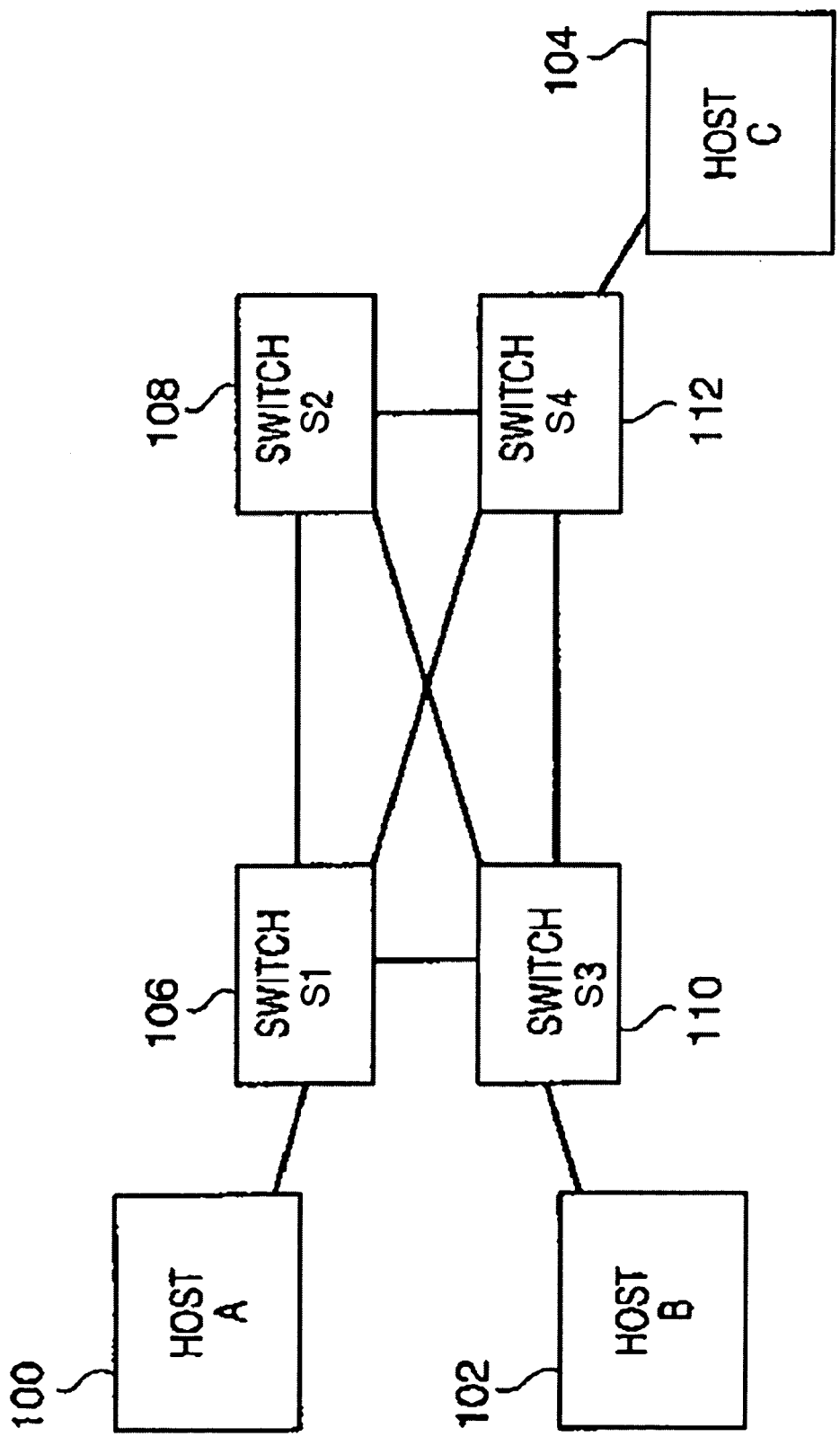
FIG. 1 is a schematic diagram of a switch network having redundant paths connecting a network of switches and associated hosts.

FIG. 1 shows an exemplary, simple networked computing environment in which multiple paths exist for communication between devices A 100, B 102, and C 104. These exemplary network devices are each attached to one of a plurality of switches (S1 106, S2 108, S3 110, and S4 112). Each device has multiple possible paths to each of the other two devices. For example, device A 100 may exchange information with device C 104 through any of three possible paths (via switches S1 106 and S4 112, respectively). The first exemplary path is a direct path connecting device A 100 directly to device C 104 through a port on switch S1 106 and a port on switch S4 112. A second path is through switch S1 106 to switch S3 110 and then through switch S4 112. A third path is via switch S1 106, switch S2 108, and switch S4,114. These three paths may be used as redundant communication paths connecting the two devices A 100 and C 104. Where a first path fails, the second path or third may be activated to assume responsibility for exchange of information between devices A and C. In like manner, there are three paths for communication between devices A 100 and B 102 and between devices B 102 and C 104.

Switches 106 through 112 as conventionally practiced in the art often use a protocol commonly referred to as "spanning tree" to discover the existence of redundant communication paths as known to a network of switches. There are three spanning tree protocols: IEEE 802.1d, 802.1w and 802.1s. See also the proposed IEEE standard P802.1p entitled "Standard for Local and Metropolitan Area Networks Supplement to Media Access Control (MAC). Bridges: Traffic Class Expediting and Dynamic Multicast Filtering."

The spanning tree protocol as implemented in switches broadcasts (more precisely multicasts) information from the switch out to all devices that recognize the selected multicast address connected to paths from the switch. A multicast message is one that is directed to all devices rather than to a particular destination address on the network. The information in the multicast message describes the address forwarding information known to that switch. From such information shared among all the switches, each switch can derive the various paths in the network. Each switch device so attached to the multicasting device. receives the information and forwards (multicasts) the message to each device attached to it (except the path from which it directly received the message), and so on. If such a multicast message returns on a path to the originating device, a loop must exist among the paths connecting the various switches. To avoid such loops, the spanning tree protocol requires that redundant paths so discovered be disabled. Only when a path is known to have failed will a redundant path be enabled and used for the exchange of data.

Figure 2:
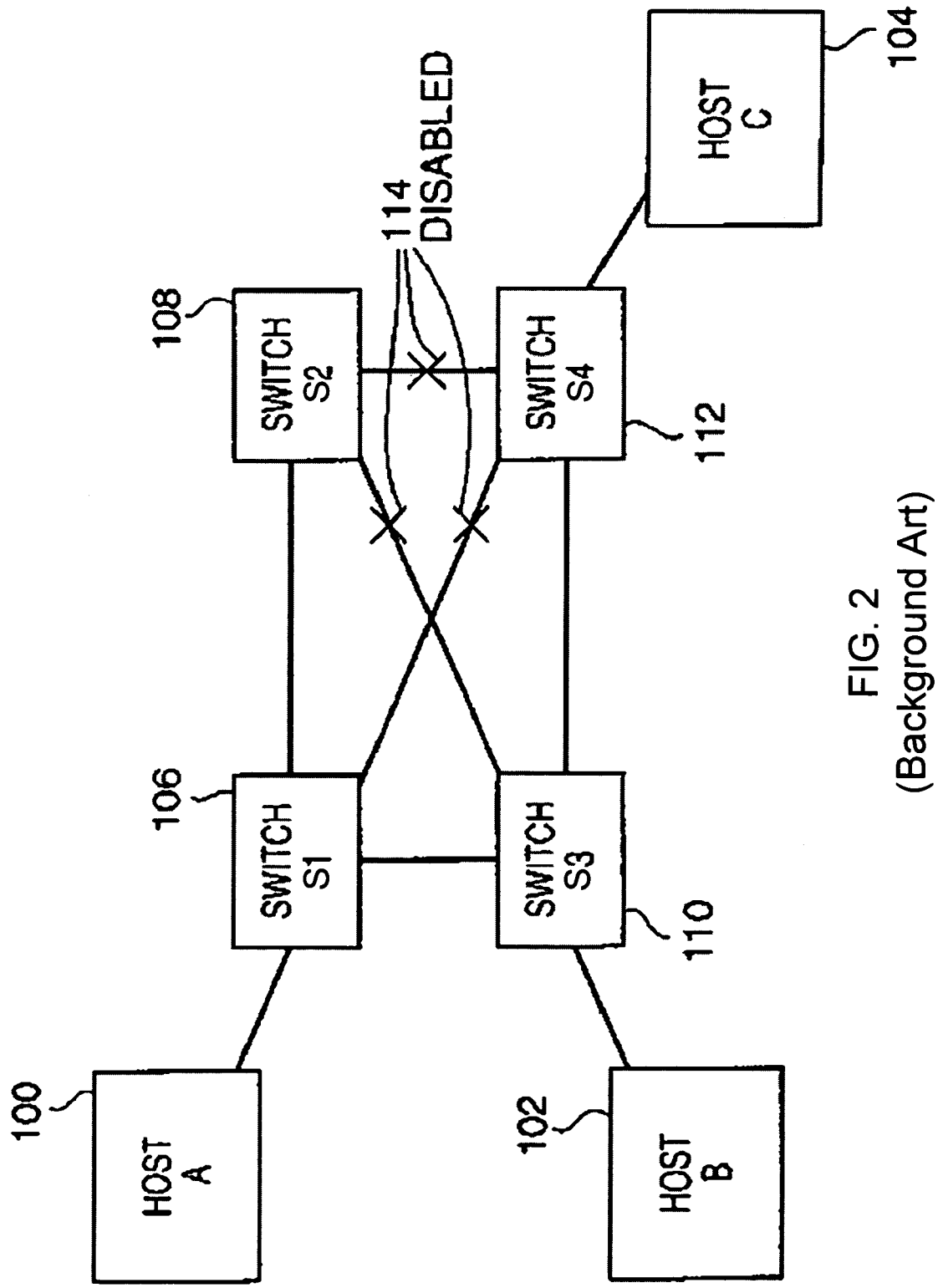
FIG. 2 is a schematic diagram of a switch network, similar to that of FIG. 1, but wherein the spanning tree protocol has disabled redundant links.

The spanning tree protocol therefore disadvantageously precludes aggregation of the available bandwidth to improve communication bandwidth by using multiple redundant paths in parallel. FIG. 2 is a block diagram of the same exemplary network of FIG. 1 where three communication links 114 between the switches have been disabled to prevent loops in the network and the resultant broadcast storm otherwise inherent in the spanning tree protocol.

Another disadvantage with the spanning tree protocol arises from the fact that a preferred path may be unavailable due to the need to disable paths that cause loops among the switches. For example, as shown in FIG. 2, the preferred path between switches S1 106 and S4 112 may be the direct one which is disabled. To leave this direct communication link enabled would permit loops in the paths among the switches. Rather, a more circuitous route through switches S1 106, S3 110 and S4 112 must be used to exchange information between switches S1 106 and S4 112. The spanning tree protocol does not assure that the best path between two switches will be left enabled. Rather, it merely attempts to assure that some path between switches is available, specifically, a relatively minimal path connecting all switches—a spanning tree. The spanning tree protocol therefore precludes maximizing use of available bandwidth in a network of switches.

It is a further disadvantage of spanning tree protocol that by precluding use of redundant links between switches, the ability to load balance among the redundant paths between switches is also precluded. In other words, spanning tree protocol does not provide a capability to use underutilized paths to offload packet communication on overloaded paths.

II. Broadcasting in Prior Switching Mesh

The above disadvantages relating to the conventional spanning tree protocol may be overcome or reduced by using a switch-to-switch protocol as described in U.S. Pat. No. 6,580, 715, entitled "Load Balancing Switch Protocols," issued Jun. 17, 2003 to Ballard C. Bare (the '715 patent) and patents related thereto. The disclosure of the '715 patent is hereby incorporated by reference. The mesh-related protocols of that patent allows compatible switch devices to distribute communication loads over multiple redundant paths.

An embodiment of the present invention overcomes or reduces certain disadvantages of the mesh-related protocols disclosed in the '715 patent. In that patent, broadcast paths are formed via a cost-based protocol. Unlike. unicast packets where the paths are picked based on cost back to the source switch, broadcast paths are picked going from the source switch.

Within a mesh topology, every switch in the mesh has its own broadcast path. A broadcast path comprises a spanning tree where the owner switch is at the root of the tree. In meshing, broadcast paths may be used to send broadcast, multicast, and certain protocol packets to every other switch in the mesh. The pruned tree is set up once going back to each source switch. All broadcast and multicast packets will use the same pruned tree. Only when link failures occur, or when new or recovered links are brought up, will this pruned tree be rebuilt.

One disadvantage with the above broadcast methodology is that every source switch in the mesh has only a single broadcast path. This can be a problem when a mesh link breaks. If the broken link is a part of a broadcast path, the switch owning that path no longer has a valid spanning tree and has to rebuild another broadcast path. While its broadcast path is being rebuilt, packets that would normally travel along the broadcast path are no longer able to get to every switch in the mesh. This can cause packet loss.

Another disadvantage in the prior meshing methodology is that the forming of a broadcast path is distributed between different switches. This means that a mesh switch will not know how its broadcast path is really formed. Without this information, debugging a broadcast path problem becomes difficult. In the prior methodology, the owner switch does not know the another switch has put a particular port in the owner switch's broadcast path.

Figure 3:
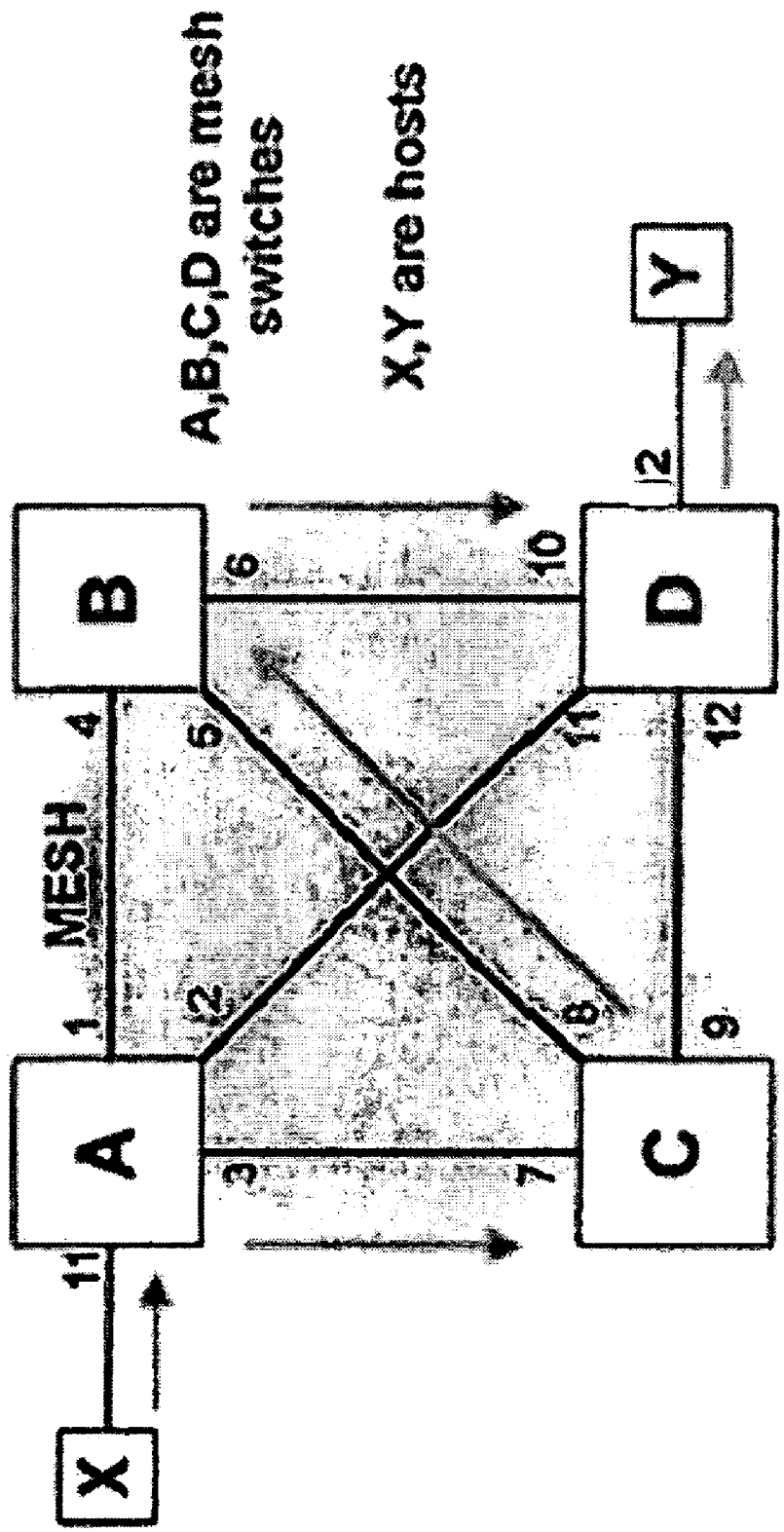
FIG. 3 is a schematic diagram depicting a mesh switch that is configured with only a single broadcast path.

FIG. 3 is a schematic diagram depicting a mesh switch (switch A) that is configured with only a single broadcast path. In the example of FIG. 3, the overall switching mesh comprises four interconnected mesh switches (A, B, C, and D). Port 1 of switch A connects to port 4 of switch B. Port 2 of switch A connects to port 11 of switch D. Port 3 of switch A is connected to port 7 of switch C. Port 5 of switch B is connected to port 8 of switch C. And so on.

In addition, host computers are depicted as coupled to the mesh. Host computer X is coupled to the mesh by way of port 11 of switch A. Host computer Y is coupled to the mesh by way of port 12 of switch D. Of course, these two host computers are shown for purposes of discussion, and many more host computers may communicate with each other by way of the switching mesh.

As shown in the example of FIG. 3, the single broadcast path owned by switch A travels as follows: exits port 3 of switch A; enters port 7 of switch C; exits port 8 of switch C; enters port 5 of switch B; exits port 6 of switch B; and enters port 10 of switch D. Consider a broadcast packet originating from host X and entering the mesh via port 11 of switch A. Such a packet would be broadcast to each switch in the mesh along the aforementioned path. Each switch would forward the packet to appropriate network segments or hosts coupled thereto. For instance, switch D may forward the packet via port 2 to host Y.

If the mesh link between switch B and switch D, for example, were to fail, then switch A's broadcast path would need to be rebuilt. Rebuilding the broadcast path would take a period of time that can be approximately two to five seconds in one implementation of such a switching mesh. During this period of time, many broadcast and multicast packets will usually be dropped. Furthermore, certain meshing protocol packets will also be dropped. The dropping of meshing protocol packets could lead to other undesirable side effects, such as delaying MAC address learning, deleting, aging, querying, and so on.

III. Improved Broadcasting in New Switching Mesh

A) Topology Protocols

1) Topology Inform Protocol

Figure 4A:
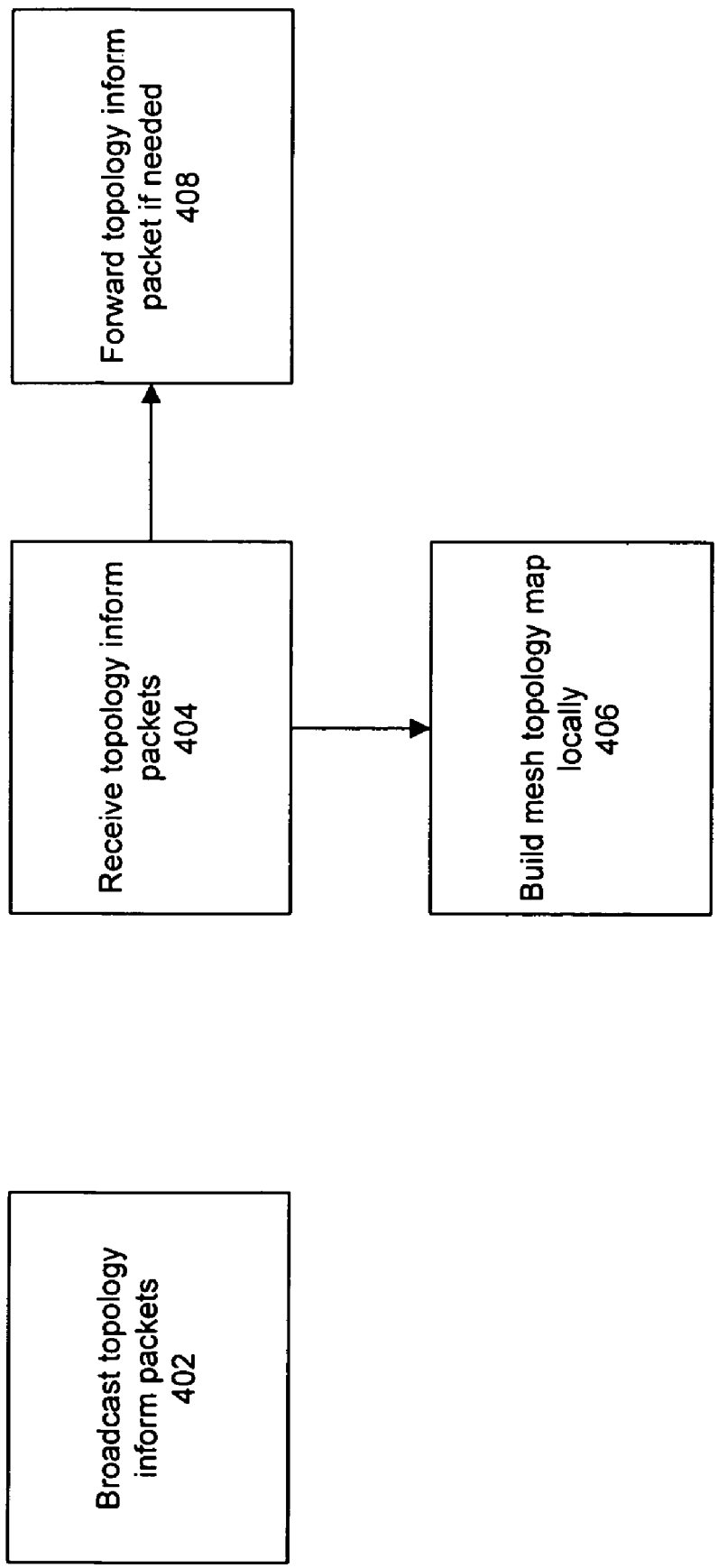
FIG. 4A is a block diagram depicting a method of building local mesh topology maps in accordance with an embodiment of the invention.

FIG. 4A is a block diagram depicting a method of building local mesh topology maps in accordance with an embodiment of the invention. The depicted method uses a mesh topology inform protocol.

Preliminarily, a switch identifier (ID) negotiation protocol may be used to enable all switches in the mesh to have a unique ID within the mesh. In one specific implementation, the switch ID may be a 64-bit value stored in an eight byte (64 bit) marked bits field. In one aspect of the switch ID negotiation protocol, new switches that enter the mesh cannot use a switch ID which is currently being used by a switch that is already in the switch ID negotiation. completed state. Alternatively, the switch IDs may be chosen by user configuration.

Once a switch has negotiated a switch ID, the switch may broadcast 402 topology inform packets to other switches belonging to the mesh. In one example, the topology inform packet may include the following information: switch ID; number of mesh links; local port number per mesh link; neighbor switch per mesh link; and neighbor switch port number per mesh link. For example, in the mesh depicted in FIG. 5, switch D may inform the rest of the mesh of: its switch ID; that it has three mesh ports numbered 10, 11, and 12; and that these ports are connected to port 6 of switch B, port 2 of switch A, and port 9 of switch C, respectively. In one embodiment, the topology inform packets may be broadcast out of all established port periodically or intermittently, such as once per minute or some other period.

The topology inform packets are received 404 by a mesh switch from other mesh switches. From the information in the topology inform packets received, a mesh topology map may be built 406 locally at each mesh switch.

The receiving mesh switch may also forward 408 the topology inform packets to neighboring mesh switches, if such forwarding is determined to be needed. In one embodiment, the forwarding mechanism may operate by using a multiple-bit field in the topology inform packet where each bit corresponds to a switch ID. If a switch has already seen this packet, then the bit may be set (otherwise, the bit should be cleared). If the bit corresponding to the neighbor mesh switch is already set, then the switch knows not to forward the packet to that neighbor. In another embodiment, a multiple-bit sequence number may be used in the topology inform packet. Switches that receive a topology inform packet would then check the sequence number to determine if it has already seen this packet. Only if the switch has not seen this packet before, will it update its information and forward the packet out of all mesh ports (other than the port connected to the source switch).

2) Topology Update Protocol

In accordance with an embodiment of the invention, a link state may be determined with a handshake mechanism between both switches. The handshake may be performed periodically (for example, every three to five minutes). The handshake may comprise a two-way handshake which utilizes request and acknowledgement messages. Alternatively, a three-way handshake may be used to indicate both switches are established. The three-way handshake may comprise the following communication sequence: 1) first switch sends a link state request message (REQ packet) to second switch on link between them; 2) second switch receives the request message and returns a first link state acknowledgement message (ACK packet) to the first switch on the same link; and 3) first switch receives the acknowledgement message and returns a second link state acknowledgment message (REQ ACK or ACK2 packet).

Figure 4B:
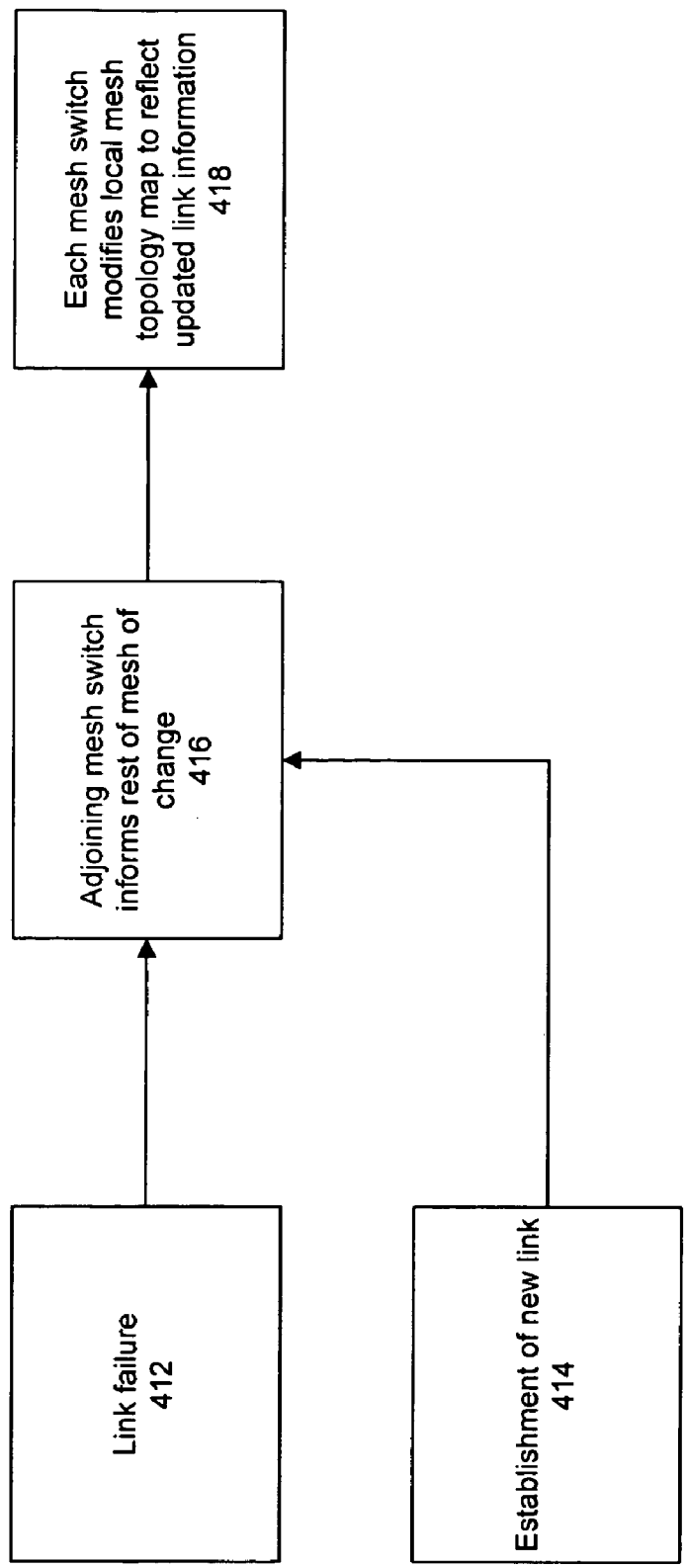
FIG. 4B is a block diagram depicting a method of maintaining local mesh topology maps in accordance with an embodiment of the invention.

FIG. 4B is a block diagram depicting a method of maintaining local mesh topology maps in accordance with an embodiment of the invention. Upon a link failure 412 or establishment 414 of a new mesh link, a mesh switch adjoining to the failed or new link will inform 416 the rest of the mesh of this change in the topology. This may be performed by using a topology update protocol. Like the topology inform protocol, the topology update protocol packets may be flooded to all mesh ports or sent along a broadcast path. To speed up processing, the topology update protocol packets may contain only information of only the links that have been entered or exited the established state of the topology. Using the received information, each mesh switch will modify 418 its mesh topology map to reflect the updated link information.

B) Multiple Broadcast Paths

Figure 5:
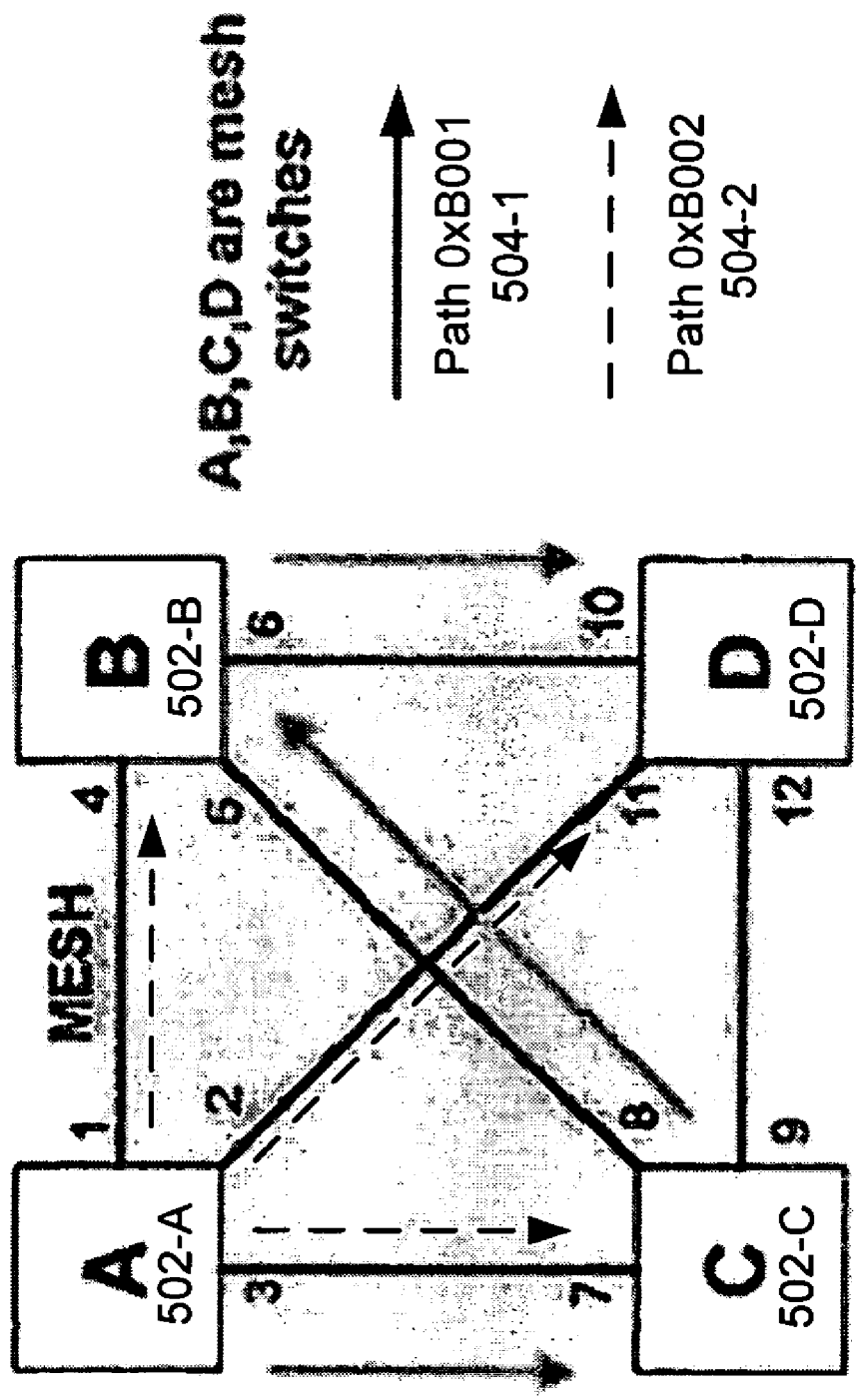
FIG. 5 is a schematic diagram depicting a switching mesh that is capable of multiple broadcast paths in accordance with an embodiment of the invention.

FIG. 5 is a schematic diagram depicting a switching mesh that is capable of multiple broadcast paths in accordance with an embodiment of the invention. As shown in FIG. 5, at least two broadcast paths are configured on switch A 502-A. A first path 504-1, designated as path 0xB001, travels as follows: exits port 3 of switch A; enters port 7 of switch C; exits port 8 of switch C; enters port 5 of switch B; exits port 6 of switch B; and enters port 10 of switch D. A second path 504-2, designated as path 0xB002, exits ports 1, 2, and 3 of switch A 502-A and enters, respectively, port 4 of switch B 502-B, port 11 of switch D 502-D, and port 7 of switch C 502-C.

In accordance with an embodiment of the invention, mesh tagging is utilized to advantageously provide redundant broadcast paths from a source switch within the mesh. In one implementation, each mesh switch may be configured with up to fifteen different broadcast paths. This is because four bits are used for the path identifier in a broadcast path tag and the zero value is considered invalid in this specific implementation. One example of such a broadcast path tag is described further below in relation to FIG. 7. Other embodiments may provide a different number of broadcast paths per switch by using a different number of bits for the path identifier. For example, if the path identifier has six bits, then each switch may be configured with sixty-three different broadcast paths.

In one embodiment, the switching device holds full knowledge of the multiple broadcast paths. The full knowledge may be advantageously utilized to facilitate the debugging of a faulty broadcast path.

1) Broadcast Path Generation

A broadcast map for a switching mesh comprises a set of paths that form a tree from a source mesh switch and connects the source switch to all other switches in the switching mesh. Many types of meshing protocol packets may be sent along a broadcast path. For example, these packets may include packets with unknown destination addresses, broadcast packets, and multicast packets.

In one specific embodiment, the redundant broadcast paths may be formed using the information gathered from the topology inform protocol discussed above. In that case, since each switch knows the entire mesh topology locally, the switch can use a graph algorithm to set up multiple broadcast paths. Once a broadcast path is set up, the switch may assign a broadcast path tag to the broadcast path.

In one embodiment, a broadcast generation packet is built by a source switch. The broadcast generation packet is configured to inform the hop switches (those in between the source switch at an end of a broadcast branch) how to forward this packet.

A mesh switch that receives a broadcast generation packet may send an acknowledgement (ACK) packet back to the prior switch (that which sent the broadcast generation packet). The receiving switch will also forward the broadcast generation packets to the next switch(es) via the indicated port(s).

In one embodiment, if the sending switch does not receive an ACK packet from each of the next mesh switches (to which the broadcast generation packet was sent), then the sending switch will inform the source switch that this broadcast path is no longer valid. This may be done by a path invalid packet that may be sent on the reverse order of the path. The source switch may then invalidate the tag and send out a path remove protocol packet along the path.

In a preferred embodiment, the broadcast path generation algorithm is configured to create redundant broadcast paths that are substantially different from one another. Preferably, the paths will be sufficiently different to prevent a single link failure from invalidating many of the redundant broadcast paths.

In one embodiment, an initial broadcast path may be rapidly generated by a simplified algorithm. Advantageously, such an initial broadcast path may be set up quickly.

2) Unicast/Broadcast Path Tags

FIG. 6 is a diagram of a path tag in accordance with an embodiment of the invention. The path tag includes a source switch identifier 602, a destination switch identifier 604, and a path identifier 606. In this embodiment, the path tag is sixteen bits in length. In particular, the source switch identifier 602 is six bits long, the destination switch identifier 604 is six bits long, and the path identifier 606 is four bits long. In this implementation, With the switch identifiers being six bits long, sixty-three different switches in the mesh may be distinguished and identified. (The value zero for the switch id being considered an invalid value in this implementation.) With the path identifier being four bits long, fifteen different paths may be identified per source/destination pair. (The value zero for the path id again being considered invalid in this implementation.) Other embodiments may have other lengths for these fields, resulting in different numbers of identifiable switches and paths.

Consider, for example, the mesh depicted in FIG. 5. Path tags of the format depicted in FIG. 6 may be used to identify different unicast paths, for instance, from switch A to switch D. Given that source and destination, each path tag would include an identifier corresponding to switch A in the source switch identifier field 602 and an identifier corresponding to switch D in the destination switch identifier field 604. Distinctive path identifiers, one per path between A and D, would be included in the path identifier field 606.

For instance, a first path may go directly from A to D by exiting port 2 of switch A and entering port 11 of switch D. A second path (not shown) may travel from A to D via switch C by exiting port 3 on switch A, entering port 7 of switch C, exiting port 9 of switch C, and entering port 12 of switch D. And so on for other possible paths. Each path is associated with a unique path identifier.

Consider that switch D subsequently learns a new MAC address and informs the rest of the mesh of the new MAC address associated with switch D. Switch A can then assign to that MAC address a path tag corresponding to one of the aforementioned paths from A to D. Then every packet destined for that MAC address that enters switch A may be forwarded through the mesh based on that assigned path tag.

In addition to unicasting packets from a source mesh switch to a specific destination mesh switch, each mesh switch may also be configured with capability to broadcast packets to every other switch belonging to the mesh.

In accordance with an embodiment of the invention, each mesh switch knows the entire mesh topology by way of the mesh topology inform protocol discussed above. Using the mesh topology, each mesh switch can build its own broadcast paths and inform the other mesh switches of these spanning trees. Moreover, each switch may be configured with a capability to build several broadcast paths that are unique or partially unique to each other and to assign any one of those paths to a broadcast packet.

Figure 7:
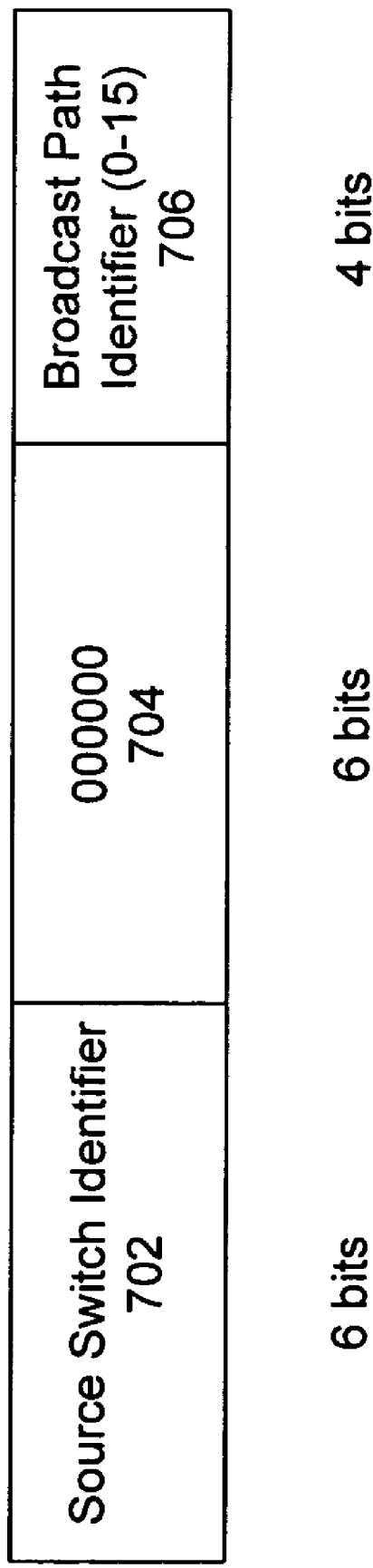
FIG. 7 is a diagram of a broadcast path tag that is inserted into the packet in accordance with an embodiment of the invention.

FIG. 7 is a diagram of a broadcast path tag that is inserted into the packet in accordance with an embodiment of the invention. The broadcast path tag of FIG. 7 is similar to the more general path tag of FIG. 6. Like the general path tag, the broadcast path tag includes a source switch identifier 702 and a path identifier 706. However, the broadcast path does not require a specific destination switch. Hence, the destination switch identifier field 704 may comprise a null value or other predetermined value to indicate that the path is a broadcast path.

3) Processing at Source Switch

Figure 8:
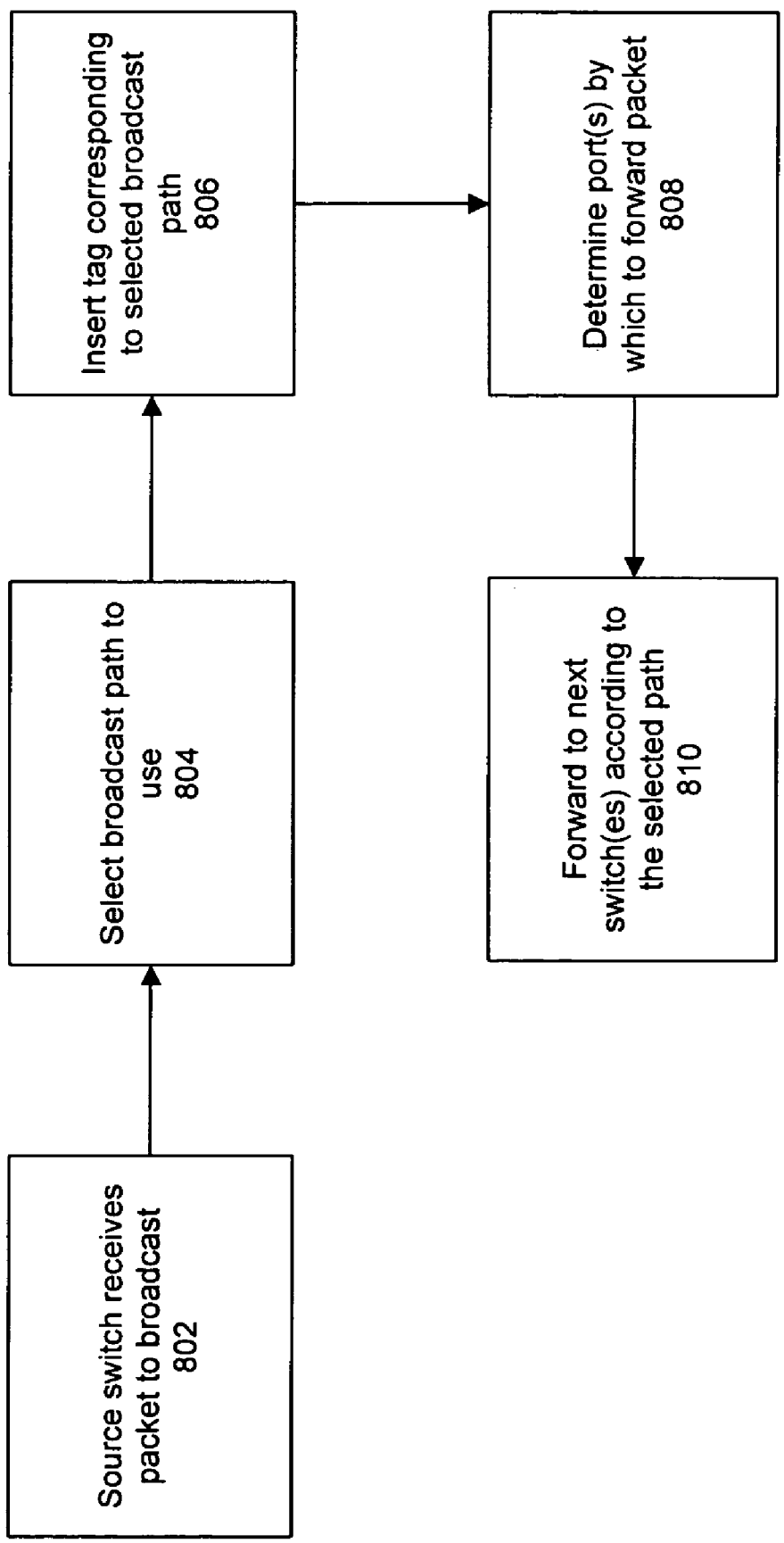
FIG. 8 is a flow chart depicting a method of broadcasting a packet along a selected path by an source switch in accordance with an embodiment of the invention.

FIG. 8 is a flow chart depicting a method of broadcasting a packet along a selected path by a "source" or "owner" switch in accordance with an embodiment of the invention. The source switch receives 802 the broadcast packet from a source host. The switch then selects or determines 804 the broadcast path to use to send the packet through the mesh.

In one embodiment, the switch selects 804 the broadcast path to be used depending on the type of traffic. The broadcast path is selected from amongst the broadcast paths generated or built by the mesh switches. For example, broadcast path 0xB001 504-1 in FIG. 5 may be used to send meshing protocol packets, and broadcast path 0xB002 504-2 may be used to send multicast traffic, and so on. In another embodiment, one broadcast path for the source switch may comprise a default path for all types of broadcast packets, and one or more other broadcast paths for the switch may comprise back-up or alternate paths to be used in case the default path is broken. In another embodiment, the broadcast path selection may be performed in order to achieve a level of load balancing across the different paths.

Once the broadcast path to use is selected 804, a tag corresponding to that broadcast path is inserted 806 into the packet. In one embodiment, the broadcast path tag may be of the format-illustrated in FIG. 8 and described in relation thereto. In one implementation, the broadcast path tag may be inserted 806 after the ether_type/length field in the packet header. In another implementation, the broadcast path tag may be inserted 806 before the ether_type/length field in the packet header. In other implementations, the broadcast path tag may be inserted 806 at other fixed offsets in the packet header.

The source switch also determines 808 the port or ports by which it is to forward the packet. Then, with the broadcast path tag inserted therein, the packet is forwarded 810 out of that port (or those ports) to the next switch(es). Thus, the packet is forwarded in accordance with the selected broadcast path. For example, if the broadcast path selected were the broadcast path 0xB001 504-1 in FIG. 5, then the packet would be forwarded 810 from source switch A 502-A to the next switch C 502-C.

4) Processing at Hop Switch

Figure 9:
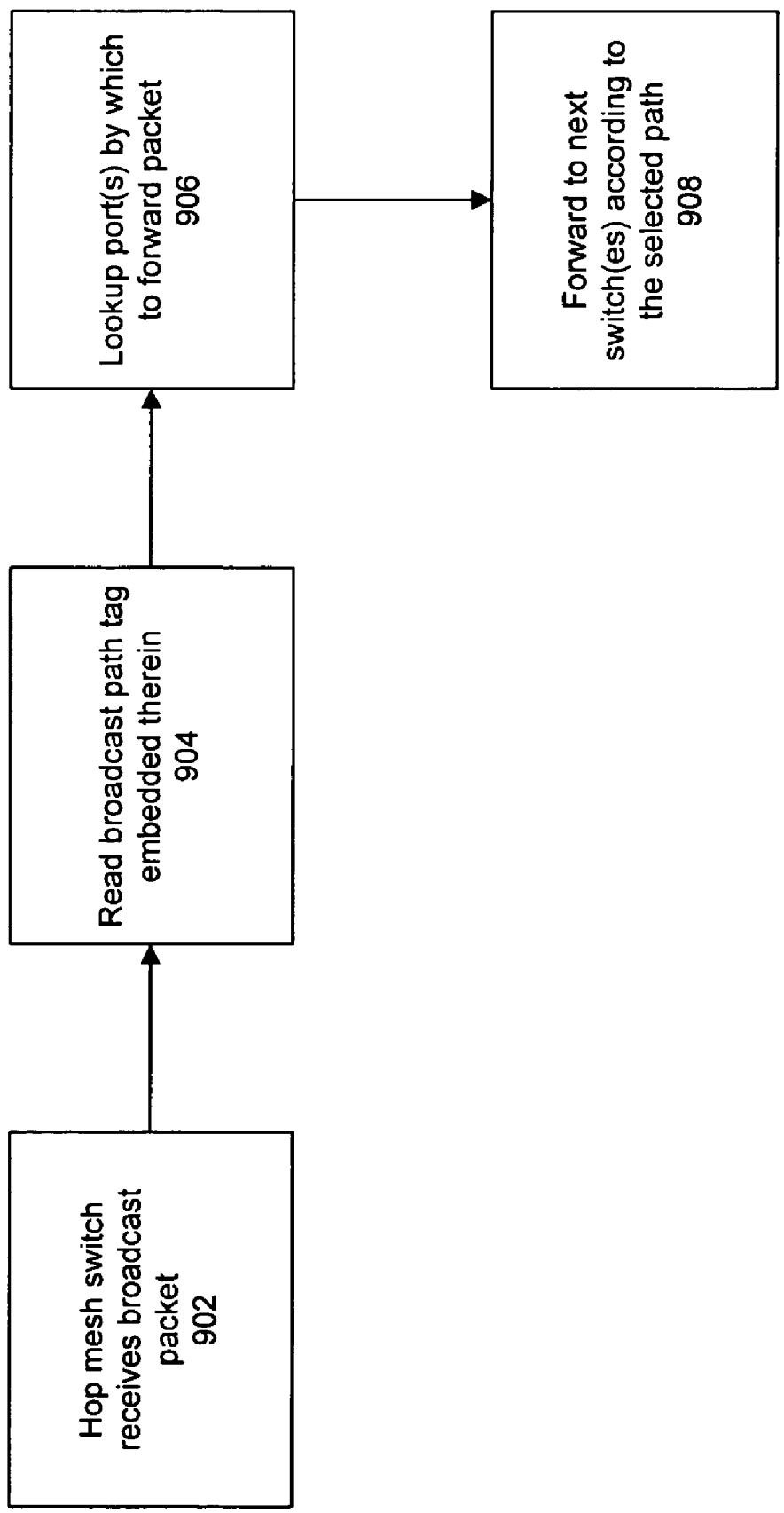
FIG. 9 is a flow chart depicting a method of forwarding a broadcast packet along a designated path by an intermediate switch in accordance with an embodiment of the invention.

FIG. 9 is a flow chart depicting a method of forwarding a broadcast packet along a designated path by a hop switch in accordance with an embodiment of the invention. A "hop" (or "intermediate") switch, as the term is used herein, refers to a mesh switch on the broadcast path but not at the beginning or end of the path.

The hop switch receives 902 the broadcast packet from a preceding switch along the broadcast path. For example, the packet may be received 902 by switch C 402-C from switch A 402-A for the broadcast path 0xB001 404-1 in FIG. 4. The hop switch knows the fixed location of the broadcast path tag and so can read 904 the broadcast path tag embedded in the packet. The broadcast path tag informs the hop switch of the originating source switch (for example, from the source switch identifier 702) and of the particular broadcast path being used to broadcast this packet (for example, from the broadcast path identifier 706). Using this information, the hop switch looks up 906 the port or ports by which it is to forward the packet for the identified broadcast path. The hop switch then forwards 908 the packet out of that port (or those ports) to the next switch(es) in the identified broadcast path. Thus, the packet is forwarded in accordance with the selected broadcast path.

5) Processing at Destination Switch

Figure 10:
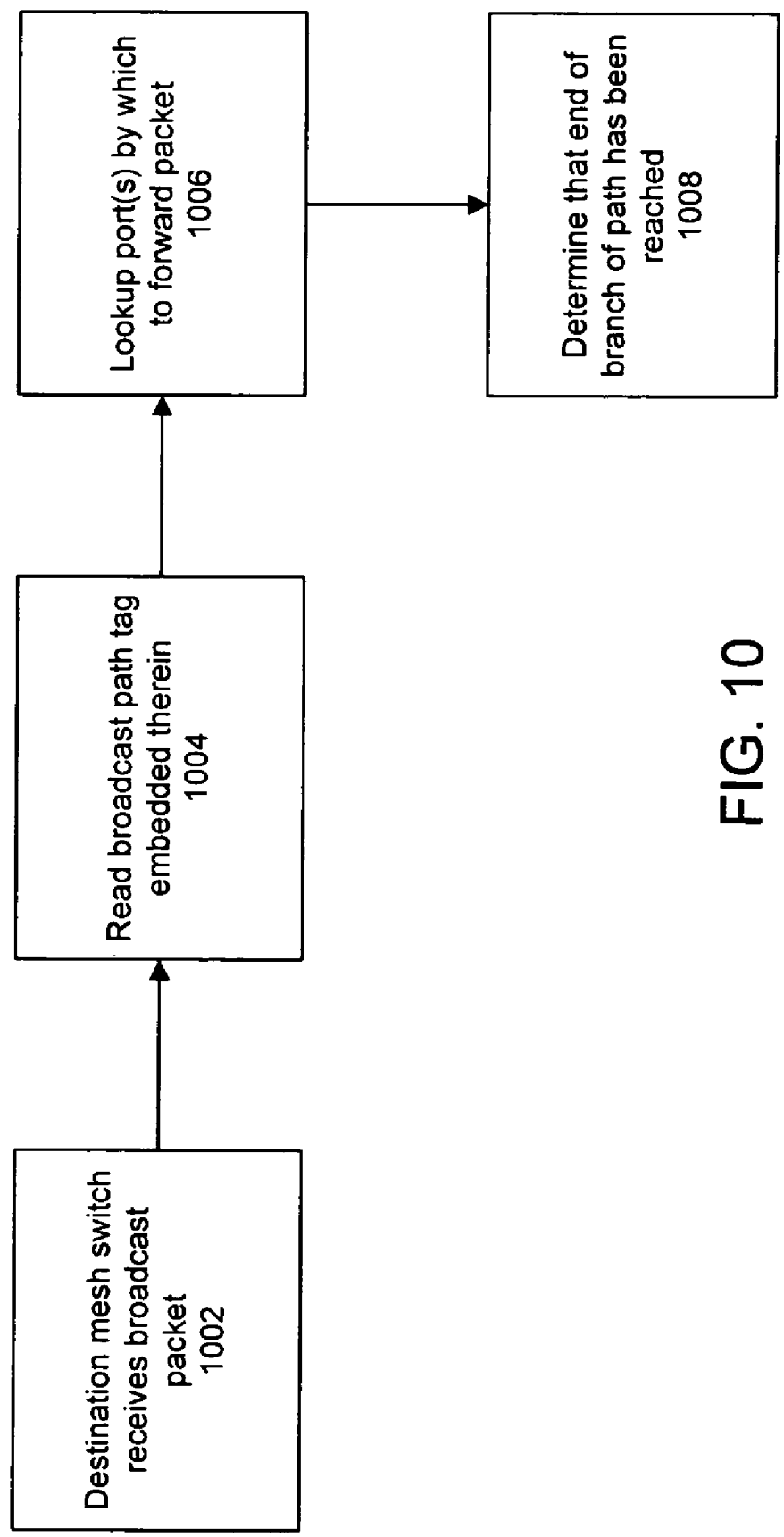
FIG. 10 is a flow chart depicting a method of receiving a broadcast packet at the end of a designated path by a switch in accordance with an embodiment of the invention.

FIG. 10 is a flow chart depicting a method of receiving a broadcast packet at the end of a designated path by a destination switch in accordance with an embodiment of the invention. A "destination" (or "end") switch, as the term is used herein, refers to a switch at the end of the broadcast path or of a branch of the broadcast path in the mesh.

The destination switch receives 1002 the broadcast packet from a preceding switch along the broadcast path. For example, the packet may be received 1002 by switch D 502-D from switch B 502-B for the broadcast path 0xB001 504-1 in FIG. 5. The end switch, like the other switches belonging to the mesh, knows the fixed location of the broadcast path tag and so can read 1004 the broadcast path tag embedded in the packet. The broadcast path tag informs the end switch of the originating source switch (for example, from the source switch identifier 702) and of the particular broadcast path being used to broadcast this packet (for example, from the broadcast path identifier 706). Using this information, the destination switch looks up 1006 the port or ports by which it is to forward the packet for the identified broadcast path. Here, no forwarding ports are indicated, so the switch determines 1008 that it is at the end of the broadcast path or a branch thereof. Since it is at the end of a branch of the path, the destination switch does not need to forward this packet to another mesh switch.

6) Forwarding Outside Mesh

Figure 11:
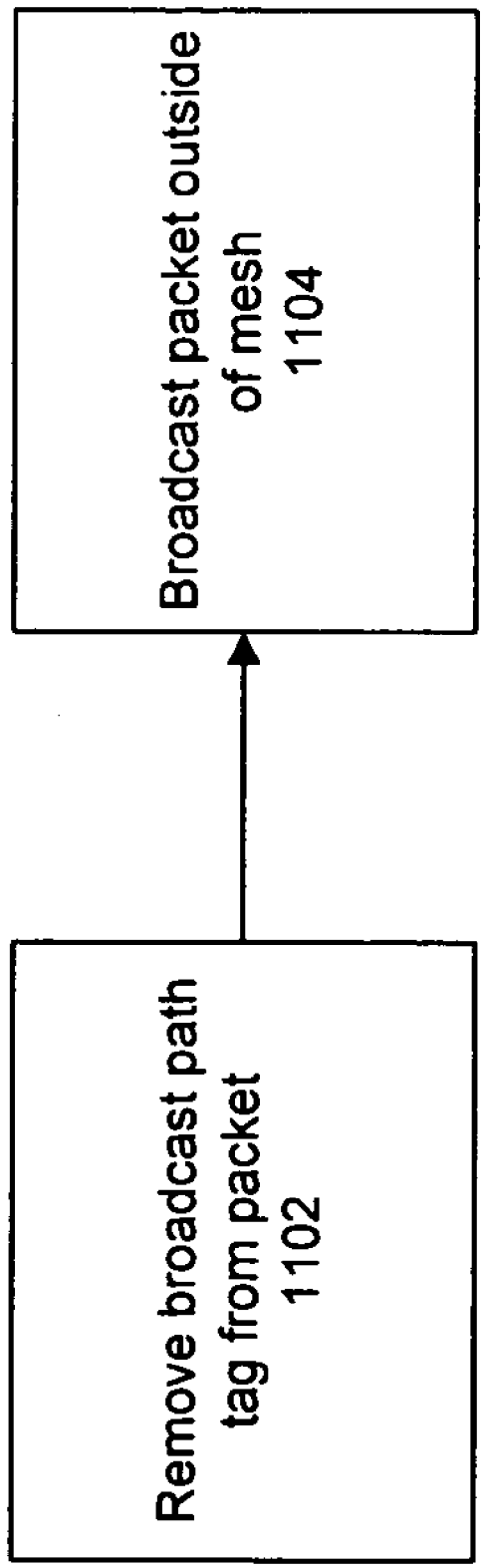
FIG. 11 is a flow chart depicting a method of forwarding a broadcast packet outside a switching mesh in accordance with an embodiment of the invention.

FIG. 11 is a flow chart depicting a method of forwarding a broadcast packet outside a switching mesh in accordance with an embodiment of the invention. Such forwarding may proceed at each mesh switch after it receives the broadcast packet. The mesh switch removes 1102 the broadcast path tag from the packet to reconstitute the packet without the tag. The switch then proceeds to broadcast 1104 the packet outside of the mesh.

7) Changing Broadcast Paths

Figure 12:
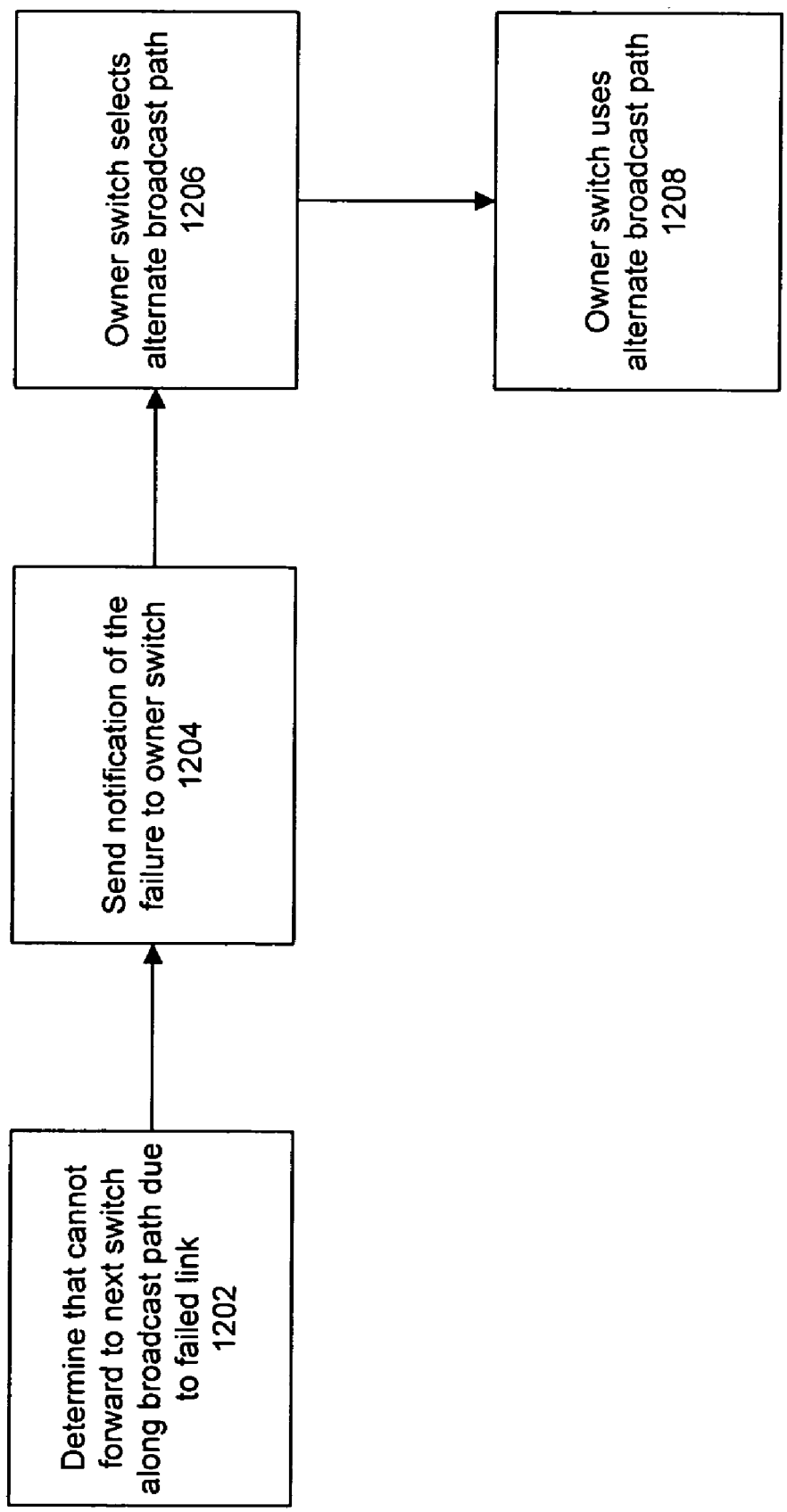
FIG. 12 is a flow chart depicting a method of changing broadcast paths due to a link failure in accordance with an embodiment of the invention.

FIG. 12 is a flow chart depicting a method of changing broadcast paths due to a link failure in accordance with an embodiment of the invention. In this case, the mesh switch determines 1202 that it is unable to forward a broadcast packet to the next switch along the designated broadcast path. This may be because of a failed link to the next switch. A notification of the failure is generated and sent 1204 to the switch that owns the broadcast path (the owner or source switch). Upon receipt of the notification, the source switch selects 1206 an alternate broadcast path and uses 1208 that alternate broadcast path going forward.

For example, consider that switch A 502-A in FIG. 5 is using broadcast path 0xB001 504-1 as its default broadcast path. In other words, switch A 502-A inserts a broadcast path tag with 0xB001 as the broadcast path identifier into its broadcast packets. Unfortunately, the mesh link between port 6 of switch B 502-B and port 10 of switch D 502-D fails. Switch B 502-B determines 1202 that it cannot forward broadcast packets from switch A 502-A and so notifies 1204 switch A 502-A of the link failure. Upon receipt of the notification, switch A 502-A may select 1206 and use 1208 the broadcast path 0xB002 504-2.

When a switch is removed from the mesh domain, all broadcast paths may be rebuilt. The rebuilding of broadcast paths may occur after the topology is rebuilt via a topology inform protocol or similar protocol.

C) Networking Apparatus

1) Packet Switch

Figure 13:
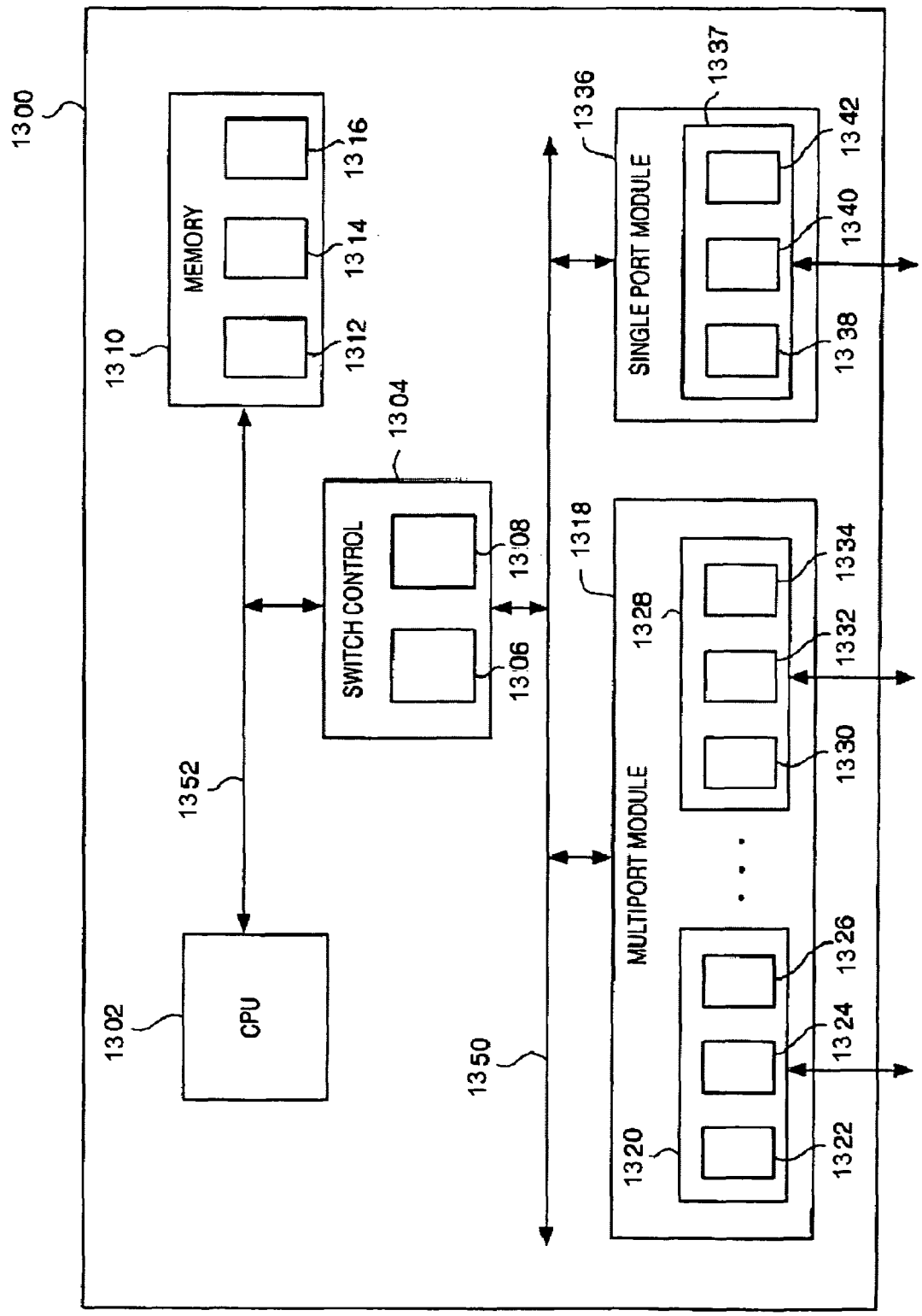
FIG. 13 is a schematic diagram of a packet switch operable in accordance with one embodiment of the invention.

FIG. 13 is a schematic diagram of a packet switch 1300 operable in accordance with one embodiment of the invention. The switch 1300 may be configured to provide multiple redundant broadcast paths spanning a switching mesh as described above.

CPU 1302 performs overall configuration and control of the switch 1300 operation. CPU 1302 operates in cooperation with switch control 1304, an application specific integrated circuit (ASIC) designed to assist CPU 1302 in performing packet switching at high speeds required by modern networks. Switch control 1304 controls the "forwarding" of received packets to appropriate locations within the switch for further processing and/or for transmission out another switch port. Switch control 1304 includes inbound and outbound high speed FIFOs (1306 and 1308, respectively) for exchanging data over switch bus 1352 with port modules. Memory 1310 includes a high and low priority inbound queue (1312 and 1314, respectively) and outbound queue 1316. High priority inbound queue 1312 is used to hold received switch control packets awaiting processing by CPU 1302 while low priority inbound queue 1314 holds other packets awaiting processing by CPU 1302. Outbound queue 1316 holds packets awaiting transmission to switch bus 1350 via switch control 1304 through its outbound FIFO 1308. CPU 1302, switch control 1304 and memory 1310 exchange information over processor bus 1352 largely independent of activity on switch bus 1350.

The ports of the switch may be embodied as plug-in modules that connect to switch bus 1350. Each such module may be, for example, a multi-port module 1318 having a plurality of ports in a single module or may be a single port module 1336. A multi-port module provides an aggregate packet switch performance capable of handling a number of slower individual ports. For example, in the preferred embodiment, both the single port module 1336 and the multi-port module 1318 may be configured to provide, for example, approximately 1 Gbit per second packet switching performance. The single port module 1336 therefore can process packet switching on a single port at speeds up to 1 Gbit per second. The multi-port module 1318 provides similar aggregate performance but distributes the bandwidth over, preferably, eight ports each operating at speeds, for example, of up to 100 Mbit per second.

Each port includes high speed FIFOs for exchanging data over its respective port. Specifically, each port, 1320,1328, and 1337, preferably includes an inbound FIFO 1322, 1330, and 1338, respectively for receiving packets from the network medium connected to the port. Further, each port 1320, 1328, and 1337, preferably includes a high priority outbound FIFO 1324, 1332, and 1340, respectively, and a low priority outbound FIFO 1326,1334, and 1342, respectively. The low priority outbound FIFOs are used to queue data associated with transmission of normal packets while the high priority outbound FIFO is used to queue data associated with transmission of control packets. Each module (1318 and 1336) includes circuits (not specifically shown) to connect its port FIFOs to the switch bus 1350.

As packets are received from a port, the packet data is applied to the switch bus 1350 in such a manner as to permit monitoring of the packet data by switch control 1304. In general, switch control 1304 manages access to switch bus 1350 by all port modules (i.e., 1318 and 1336). All port modules "listen" to packets as they are received and applied by a receiving port module to switch bus 1350. If the packet is to be forwarded to another port, switch control 1304 applies a trailer message to switch bus 1350 following the end of the packet to identify which port should accept the received packet for forwarding to its associated network link:

2) New/Modified Tables

In the preferred embodiment, the memory 1310 in the switch 1300 also includes various tables which are utilized in implementing the multiple broadcast path functionality. Examples of those tables are depicted in FIG. 14. As depicted in FIG. 14, the switch 1300 may include and utilize a modified Layer 2 (L2) MAC table 1402, a tag table 1404, and a broadcast port map filter 1406.

As shown in FIG. 14, the L2 MAC table 1402 may be a modified version of a conventional L2 MAC Table. A conventional MAC table includes MAC address, VLAN identifier (VID), and port fields. In accordance with an embodiment of the invention, the L2 MAC table 1402 is modified so as to include a path tag. For example, the path tag may comprise a 16-bit tag such as described above in relation to FIGS. 7 and 8.

In addition, a new table, called a tag table 1404, is created and utilized in accordance with an embodiment of the invention. The tag table 1404 associates an exit port to each path tag. The tag table 1404 includes information to indicate whether the port field within the tag table 1404 represents a conventional port number or a set of ports. For example, the L2 MAC table entry with tag 4532 in FIG. 14 indexes into the tag table 1404 to a tag table entry which indicates that port 10 should be used to send out the packet.

In one implementation, a set of ports (rather than a conventional port number) is indicated when a broadcast flag ("bcast?") in the tag table 1404 is set. In this implementation, when the broadcast flag is set, then the port field is used as an index into the broadcast port map filter 1406. For example, the tag table entry with tag 7524 in FIG. 14 has its broadcast flag set, indicating that the 2 in the port field is to be used to index into the broadcast port map filter 1406.

The broadcast port map filter 1406 may be implemented as an index field and a port map. In one implementation, the port map may comprise a multiple bit field where each bit corresponds to a port. When a bit is set, then the corresponding port is a member of the set of ports. The packet to be broadcast is sent from each member port in the set of ports. For example, the broadcast port map filter entry with index 2 has a corresponding port map 00000000000000001110101011. That port map has seven bits set, indicating that the set of ports includes seven ports corresponding to those bits.

In one embodiment of the invention, the packet switch includes with a switch ASIC (application specific integrated circuit) configured to operate in accordance with the following operating rules (among other rules as may be configured, for example, to handle unicast packets):

a) Broadcast/Multicast on Non-mesh Port

When a switch receives a broadcast or multicast packet on a non-mesh port, the packet will be forwarded out of non-mesh ports on the VLAN that the packet was received. In addition, the switch inserts a broadcast path tag in the packet. The switch forwards this packet (with tag embedded therein) out of the ports for that broadcast path.

b) Broadcast/Multicast with Known Tag on Mesh Port

When a switch receives a broadcast or multicast packet with a known broadcast path tag on a mesh port, then the following two operations may be performed. a) The switch looks up the broadcast path tag within the tag table, and it forwards the packet out of all mesh ports indicated by the filter entry associated with the broadcast path tag. b) The switch strips the tag from the packet, and it forwards the packet (with tag stripped therefrom) out of all non-mesh ports indicated by the filter entry associated with the broadcast path tag.

c) Unknown Tag on Mesh Port

When a switch receives a packet with an unknown tag on a mesh port, then the switch may forward the packet up to the CPU of the switch. The packet will not be forwarded out of any ports.

Those skilled in the art will recognize many other functions that may be performed in an ASIC assist device such as switch control 1304. Similarly, those skilled in the art will recognize that the above and other functions may be performed by a suitable programmed general purpose processor having adequate performance or where the packet switching performance is a less critical factor.

In accordance with an embodiment of the invention, an owner (or source) switch is enabled to inform the rest of the mesh what it wants as its broadcast path. In other words, for example, switch A can inform switch C that it wants switch C's port 8 to be in switch A's default broadcast path. Likewise, switch A can inform switch B that it wants switch B's port 6 in its default broadcast path.

Advantageously, if the multiple broadcast paths setup by a mesh switch are sufficiently unique, then a link failure may cause one or more broadcast paths to be broken, but it should not break all broadcast paths from the source switch. Broadcast paths are unique from each other if they do not contain different mesh links. Another advantage is that a mesh switch with full knowledge of its broadcast path facilitates debugging of the broadcast path.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method of broadcasting packets through a network of switches, the method comprising:

receiving a packet to broadcast through the network of switches;

selecting a broadcast path from a plurality of generated broadcast paths;

creating a broadcast path tag associated with the selected broadcast path;

inserting the broadcast path tag into the packet;

determining port(s) by which to forward the packet;

transmitting the packet, with the broadcast path tag embedded therein, via the port(s) to next switch(es) in accordance with the selected broadcast path;

receiving the packet by a hop switch;

reading the broadcast path tag embedded therein;

determining port(s) by which to forward the packet; and transmitting the packet, with the broadcast path tag embedded therein, via the port(s) to next switch(es) in accordance with the selected broadcast path.

2. The method of claim 1, wherein the port(s) are determined by looking up the broadcast path tag in a tag table.

3. The method of claim 1, further comprising:

receiving the packet by a destination switch;

reading the broadcast path tag embedded therein; and determining that an end of a branch of the broadcast path has been reached.

4. The method of claim 1, wherein the packet is forwarded outside the network of switches by removing the broadcast path tag from the packet and broadcasting the packet (with the broadcast path tag removed) outside of the network of switches.

5. The method of claim 1, wherein the method comprises multipath broadcasting in that different broadcast paths are selected to broadcast packets depending on specific criteria.

6. The method of claim 1, wherein the broadcast path tag comprises a source switch identifier, a code indicating a broadcast, and a path identifier.

7. A method of broadcasting packets through a network of switches, the method comprising:

receiving a packet to broadcast through the network of switches;

selecting a broadcast path from a plurality of generated broadcast paths;

creating a broadcast path tag associated with the selected broadcast path;

inserting the broadcast path tag into the packet;

determining port(s) by which to forward the packet; and transmitting the packet, with the broadcast path tag embedded therein, via the port(s) to next switch(es) in accordance with the selected broadcast path, wherein the method comprises multipath broadcasting in that different broadcast paths are selected to broadcast packets depending on specific criteria, and wherein the criteria relates to a type of the packet.

8. A method of broadcasting packets through a network of switches, the method comprising:

receiving a packet to broadcast through the network of switches;

selecting a broadcast path from a plurality of generated broadcast paths;

creating a broadcast path tag associated with the selected broadcast path;

inserting the broadcast path tag into the packet;

determining port(s) by which to forward the packet; and transmitting the packet, with the broadcast path tag embedded therein, via the port(s) to next switch(es) in accordance with the selected broadcast path, wherein the method comprises multipath broadcasting in that different broadcast paths are selected to broadcast packets depending on specific criteria, and wherein the criteria relates to load balancing across the different broadcast paths.

9. A switching device configured to be a member of a switching mesh, the switching device comprising:

a plurality of ports;

a switch control device coupled to the plurality of ports, wherein the switch control device is configured to provide multiple broadcast paths from a source switch through the switching mesh;

a layer 2 media access (MAC) table which includes broadcast path tags associated with the multiple broadcast paths; and a tag table referenced by the broadcast path tags.

wherein the tag table comprises a broadcast flag.

10. The switching device of claim 9, wherein the switch control device comprises an application specific integrated circuit (ASIC).

11. The switching device of claim 9, wherein the switch control device comprises a central processing unit configured to execute sequences of instructions.

12. The switching device of claim 9, wherein the switching device holds full knowledge of the multiple broadcast paths.

13. The switching device of claim 9, wherein if the broadcast flag is set for an entry in the tag table, then the path tag of the entry is utilized to index into a broadcast port map filter.

14. The method of claim 9, wherein the broadcast paths comprise spanning trees, and wherein the method is performed by an owner switch at a root of the spanning tree.

* * * * *

UNITED STATES PATENT AND TRADEMARK OFFICE
CERTIFICATE OF CORRECTION

| | | |
|---|---|---|
| PATENT NO. | : 7,447,223 B2 | Page 1 of 1 |
| APPLICATION NO. | : 10/767236 | |
| DATED | : November 4, 2008 | |
| INVENTOR(S) | : Shaun Kazuo Wakumoto et al. | |

It is certified that error appears in the above-identified patent and that said Letters Patent is hereby corrected as shown below:

In column 4, line 39, delete "S4,114" and insert -- S4 114 --, therefor.

In column 16, line 26, in Claim 9, delete "tags." and insert -- tags, --, therefor.

Signed and Sealed this

Sixteenth Day of February, 2010

David J. Kappos
*Director of the United States Patent and Trademark Office*